(12) United States Patent
Shih et al.

(10) Patent No.: US 10,710,376 B2
(45) Date of Patent: Jul. 14, 2020

(54) INKJET POSITION ADJUSTMENT METHOD AND THREE-DIMENSIONAL PRINTING EQUIPMENT

(71) Applicants: XYZprinting, Inc., New Taipei (TW); Kinpo Electronics, Inc., New Taipei (TW)

(72) Inventors: Ko-Wei Shih, New Taipei (TW); Hsin-Ta Hsieh, New Taipei (TW); Yu-Ting Huang, New Taipei (TW); Kuo-Yen Yuan, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 16/163,550

(22) Filed: Oct. 17, 2018

(65) Prior Publication Data
US 2020/0009878 A1    Jan. 9, 2020

(30) Foreign Application Priority Data
Jul. 9, 2018   (CN) .......................... 2018 1 0743559

(51) Int. Cl.
*B41J 3/407* (2006.01)
*B41J 2/045* (2006.01)
(Continued)

(52) U.S. Cl.
CPC ......... *B41J 3/4073* (2013.01); *B41J 2/04508* (2013.01); *B41J 2/04586* (2013.01);
(Continued)

(58) Field of Classification Search
CPC .. B41J 3/4073; B41J 2/04586; B41J 2/04508; G06T 17/20; B33Y 30/00; B33Y 10/00; B33Y 50/02; H04N 1/60; B29C 64/393
See application file for complete search history.

(56) References Cited

U.S. PATENT DOCUMENTS

| 5,345,391 A | 9/1994 | Hull et al. |
| 2002/0167101 A1* | 11/2002 | Tochimoto .............. B29C 41/36 264/40.1 |

(Continued)

OTHER PUBLICATIONS

"Office Action of Taiwan Counterpart Application", dated Nov. 7, 2018, p. 1-p. 11.
(Continued)

*Primary Examiner* — Bradley W Thies
(74) *Attorney, Agent, or Firm* — JCIPRNET

(57) ABSTRACT

The inkjet position adjustment method includes the following steps. A three-dimensional digital model is obtained, and a slicing processing is performed on the three-dimensional digital model to generate a layer object having a cross-sectional contour. A normal direction of an object surface corresponding to the layer object is obtained from the three-dimensional digital model. When the normal direction points to a negative direction of a first axis, a surface tilt degree of the object surface corresponding to the layer object is obtained, and an inner-shift amount of an inkjet position of the layer object is calculated according to the surface tilt degree. An inkjet region of the layer object is obtained according to the inner-shift amount and the cross-sectional contour. After controlling a print module to print the layer object, an inkjet module is controlled to inject ink on the layer object according to the inkjet region.

8 Claims, 7 Drawing Sheets

(51) Int. Cl.
*B33Y 10/00* (2015.01)
*B33Y 30/00* (2015.01)
*G06T 17/20* (2006.01)

(52) U.S. Cl.
CPC ............... *B33Y 10/00* (2014.12); *B33Y 30/00* (2014.12); *G06T 17/20* (2013.01)

(56) References Cited

U.S. PATENT DOCUMENTS

2015/0367571 A1 12/2015 Kanada
2018/0186090 A1 7/2018 Shih et al.
2018/0189618 A1 7/2018 Huang et al.

OTHER PUBLICATIONS

"Search Report of Europe Counterpart Application", dated Jul. 18, 2019, pp. 1-9.

* cited by examiner

INKJET POSITION ADJUSTMENT METHOD AND THREE-DIMENSIONAL PRINTING EQUIPMENT

CROSS-REFERENCE TO RELATED APPLICATION

This application claims the priority benefit of China application serial no. 201810743559.1, filed on Jul. 9, 2018. The entirety of the above-mentioned patent application is hereby incorporated by reference herein and made a part of this specification.

BACKGROUND

Technical Field

The disclosure relates to a three-dimensional printing inkjet technology. More particularly, the disclosure relates to an inkjet position adjustment method and a three-dimensional printing equipment.

Description of Related Art

With the progress in computer-aided manufacturing (CAM), manufacturers have developed the technology of three-dimensional printing for rapidly embodying an original design concept. Three-dimensional printing technology is actually a generic term for a series of rapid prototyping (RP) techniques. A basic principle thereof is to laminate manufacturing on a printing platform, wherein an RP machine sequentially prints, on the printing platform, a plurality of layer objects within a horizontal plane through scanning, so that the layer objects can be stacked to form a three-dimensional printed object. Taking the fused deposition modeling (FDM) technique as an example, it turns a forming material into wires and then heats and melts the forming material, so as to stack the material layer by layer on a forming platform according to the desired shape/profile to form a three-dimensional object.

In response to the demand for three-dimensional color printing, the current three-dimensional printing technology further includes performing inkjet printing operation on the three-dimensional printed object while printing. That is, when a three-dimensional printing apparatus prints the layer objects, the three-dimensional printing apparatus can meanwhile color each of the layer objects layer by layer so as to produce a color three-dimensional object. In a three-dimensional color printing technology, the three-dimensional printing apparatus may color the contour edge of each of the layer objects according to the pre-determined inkjet width, as such, the surface of the three-dimensional object may appear colors. To be specific, when the three-dimensional printing apparatus performs the inkjet printing operation, the inkjet head coats ink on the edge portions of the upper surfaces of the layer objects.

Ideally, the ink ejected from the inkjet head is to be completely fall on the upper surfaces of the layer objects. Nevertheless, when the edge portion of one layer object is suspended, the unsupported edge portion without support below may slightly collapse, and the edge of the actual object being formed are thus different from the edge of an ideal object. In this case, since the inkjet region of the inkjet head is determined based on the pre-determined inkjet width and the cross-sectional contour of the layer object and the collapse of the edge of the object is an unexpected event for the processing software, the ink sprayed according the inkjet region generated without considering the collapse of the layer object may not completely fall on the layer object. As such, the ink may spill on the platform or the object below. FIG. 1 illustrates an example of inkjet printing operation performed on an edge portion of a layer object. As shown in FIG. 1, when an edge portion of a layer object L1 is suspended, an edge portion 11 slightly collapses, such that an edge E1 of the actual object being formed is different from an ideal edge E2 of an ideal object. As such, ink sprayed by an inkjet head 12 based on a pre-determined width Wk and the ideal edge E2 of the ideal object may spill and thus pollutes the three-dimensional object in printing or the platform. Therefore, how a favorable three-dimensional color printing method can be designed is an important issue in this field.

SUMMARY

The disclosure provides an inkjet position adjustment method and a three-dimensional printing equipment capable of adjusting an inkjet position according to a surface tilt degree corresponding to a layer object to prevent ink from spilling.

An embodiment of the disclosure provides an inkjet position adjustment method adapted to print a color three-dimensional object. The inkjet position adjustment method includes the following steps. A three-dimensional digital model is obtained, and a slicing processing is performed on the three-dimensional digital model to generate a layer object having a cross-sectional contour. A normal direction of an object surface corresponding to the layer object is obtained from the three-dimensional digital model. When the normal direction points to a negative direction of a first axial direction, a surface tilt degree of the object surface corresponding to the layer object is obtained from the three-dimensional digital model and an inner-shift amount of an inkjet position of the layer object is calculated according to the surface tilt degree corresponding to the layer object. An inkjet region of the layer object is obtained according to the inner-shift amount and the cross-sectional contour. After a print module is controlled to print the layer object, an inkjet module is controlled to inject ink on the layer object along the cross-sectional contour according to the inkjet region.

In an embodiment of the disclosure, the step of obtaining the normal direction of the object surface corresponding to the layer object from the three-dimensional digital model includes the following steps. At least one polygon mesh corresponding to the layer object is obtained from the three-dimensional digital model. A normal vector of the at least one polygon mesh is obtained, and the normal vector points to an outside of the three-dimensional digital model.

In an embodiment of the disclosure, the method further includes the following steps. Whether the normal direction points to a negative direction of a first axial direction is determined, and the first axial direction is perpendicular to a horizontal plane.

In an embodiment of the disclosure, the step of obtaining the surface tilt degree of the object surface corresponding to the layer object from the three-dimensional digital model when the normal direction points to the negative direction of the first axial direction and calculating the inner-shift amount of the inkjet position of the layer object according to the surface tilt degree corresponding to the layer object includes the following steps. At least one included angle between the at least one polygon mesh and the horizontal plane is calculated for representing the surface tilt degree.

The inner-shift amount of the inkjet position of the layer object is calculated according to the at least one included angle and a pre-determined inner-shift amount.

In an embodiment of the disclosure, the step of calculating the inner-shift amount of the inkjet position of the layer object according to the at least one included angle and the pre-determined inner-shift amount includes the following step. A product of a cosine value of the at least one included angle, the pre-determined inner-shift amount related to a reference angle, and an adjustment parameter is calculated to obtain the inner-shift amount.

In an embodiment of the disclosure, the adjustment parameter is a reciprocal of a cosine value of the reference angle, and the reference angle is between 0 to 90 degrees.

In an embodiment of the disclosure, the at least one polygon mesh includes a first polygon mesh and a second polygon mesh. The step of calculating the at least one included angle between the at least one polygon mesh and the horizontal plane includes the following steps. A first included angle between the first polygon mesh and the horizontal plane is calculated and a second included angle between the second polygon mesh and the horizontal plane is calculated.

In an embodiment of the disclosure, the step of calculating the inner-shift amount of the inkjet position of the layer object according to the at least one included angle and the pre-determined inner-shift amount includes the following steps. A first inner-shift amount of the inner-shift amount is calculated according to the first included angle and the pre-determined inner-shift amount. A second inner-shift amount of the inner-shift amount is calculated according to the second included angle and the pre-determined inner-shift amount.

In an embodiment of the disclosure, the step of obtaining the inkjet region of the layer object according to the inner-shift amount and the cross-sectional contour includes the following steps. An inkjet image is generated according to the inner-shift amount, an inkjet width, and the cross-sectional contour, and the inkjet image includes an inkjet region which is formed based on the inner-shift amount.

In another perspective, an embodiment of the disclosure further provides a three-dimensional printing equipment adapted to manufacture a color three-dimensional object, and the three-dimensional printing equipment includes a print module, an inkjet module, a storage apparatus, and a processing apparatus. The print module includes a print head, and the inkjet module includes an inkjet head. The storage apparatus records a plurality of modules, and the processing apparatus is coupled to the storage apparatus and configured to execute the modules. A three-dimensional digital model is obtained, and a slicing processing is performed on the three-dimensional digital model to generate a layer object having a cross-sectional contour. A normal direction of an object surface corresponding to the layer object is obtained from the three-dimensional digital model. When the normal direction points to a negative direction of a first axial direction, a surface tilt degree of the object surface corresponding to the layer object is obtained from the three-dimensional digital model and an inner-shift amount of an inkjet position of the layer object is calculated according to the surface tilt degree corresponding to the layer object. An inkjet region of the layer object is obtained according to the inner-shift amount and the cross-sectional contour. After the print module is controlled to print the layer object, the inkjet module is controlled to inject ink on the layer object along the cross-sectional contour according to the inkjet region.

To sum up, in the inkjet position adjustment method and the three-dimensional printing equipment provided by the embodiments of the disclosure, the inner-shift amount of the inkjet position may be determined according to the surface tilt degree corresponding to the layer object. Further, a new inkjet position is generated by shifting the original inkjet position according to the inner-shift amount. After the layer object is printed by the print head, the three-dimensional printing equipment may control the inkjet module to inject ink on the layer object along the cross-sectional contour according to the adjusted inkjet region. In this way, the ink is prevented from spilling on the three-dimensional object or platform below when the edge of the layer object collapses.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
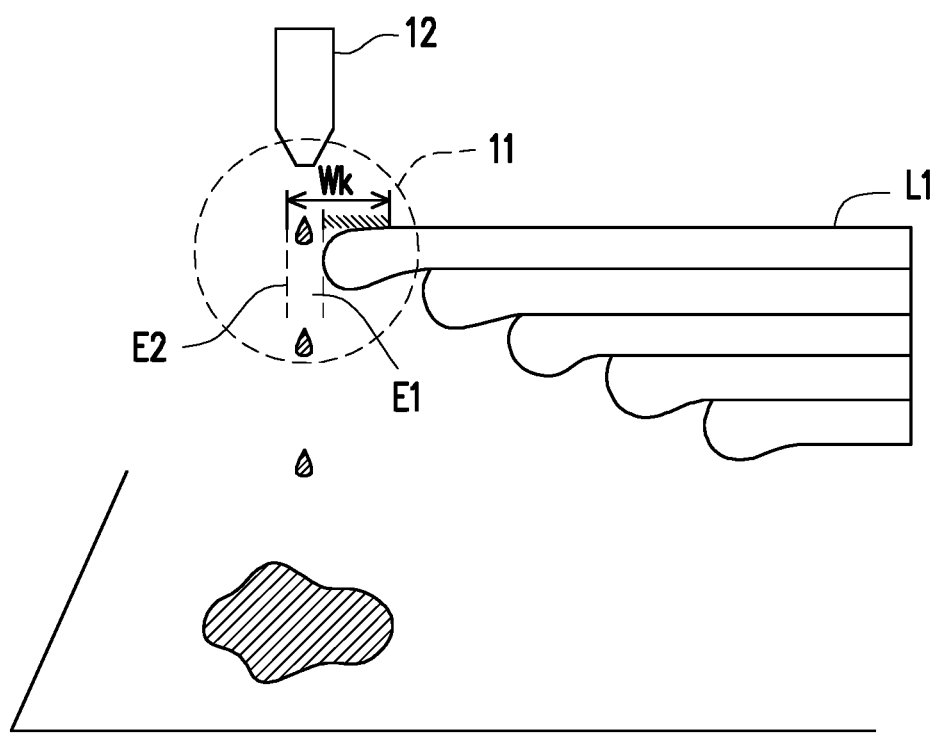
FIG. 1 illustrates an example of inkjet printing operation performed on an edge portion of a layer object.

In order to make the disclosure more comprehensible, several embodiments are described below as examples of implementation of the disclosure. Moreover, elements/components/steps with the same reference numerals are used to represent the same or similar parts in the drawings and embodiments.

Figure 2:
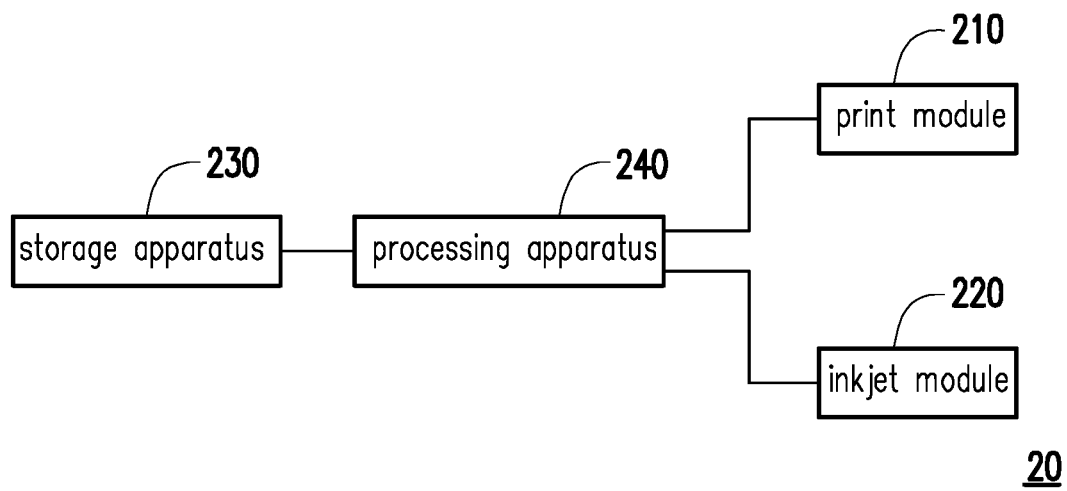
FIG. 2 is a schematic block diagram of a three-dimensional printing equipment according to an embodiment of the disclosure.

FIG. 2 is a schematic diagram illustrating a three-dimensional printing equipment according to an embodiment of the disclosure. With reference to FIG. 2, a three-dimensional printing equipment 20 includes a print module 210, an inkjet module 220, a storage apparatus 230, and a processing apparatus 240. The processing apparatus 240 is coupled to the print module 210, the inkjet module 220, and the storage apparatus 230. In this embodiment, the processing apparatus 240 is configured to control the print module 210 and the inkjet module 220 to carry out the three-dimensional printing operation.

In the embodiment, the storage apparatus 230 may be configured to store data and may be a buffer memory, an internal storage medium, an external storage medium, other types of storage apparatuses, or a combination thereof. For example, the buffer memory may include a random access memory, a read only memory, or other similar apparatuses. For example, the internal storage medium may include a hard disk drive (HDD), a solid state disk, a flash storage apparatus, or other similar apparatuses. For example, the external storage medium may include an external hard drive, a USB drive, a cloud drive, or other similar apparatuses. In an embodiment, the storage apparatus 230 may be further configured to store a plurality of modules, and the modules may be software programs, so as to enable the processing apparatus 240 to read or execute the modules for carrying out the inkjet position adjustment method in the respective embodiments of the disclosure.

In this embodiment, the processing apparatus 240 may include a processing chip and an image processing chip or may be, for example, a central processing unit (CPU) or other programmable general/specific purpose microprocessors, digital signal processors (DSPs), programmable controllers, application specific integrated circuits (ASICs), programmable logic devices (PLDs), other similar processing circuits, or a combination of the foregoing apparatuses.

In this embodiment, the processing apparatus 240 may control the print module 210 and the inkjet module 220 to carry out the three-dimensional printing operation and the inkjet operation based on a three-dimensional digital model. For example, the three-dimensional printing operation includes extruding a forming material on a forming platform through the print module 210. In addition, the inkjet module 220 may perform the inkjet printing operation on the forming material on the forming platform after the forming material is cured or when the forming material is curing. Moreover, people having ordinary skills in the art shall understand that the three-dimensional printing equipment 20 may also include other components required to perform the three-dimensional printing operation and the inkjet printing operation together with the print module 210 and the inkjet module 220, such as a forming platform, a feeding line, an inkjet line, a print head linking mechanism, a driving motor, and the like.

Note that in an embodiment, the three-dimensional printing equipment 20 may include a computer host and a three-dimensional printer including the print module 210 and the inkjet module 220, and the processing apparatus 240 may be implemented as a processor of the computer host and a processor and/or a controller of the three-dimensional printer. For instance, the three-dimensional printing equipment 20 may be constituted by a notebook computer or a desktop computer and the three-dimensional printer, and the disclosure does not intend to impose a limitation on this regard. In another embodiment, the three-dimensional printing equipment 20 may also be a three-dimensional printer capable of processing a three-dimensional digital model, and the processing apparatus 240 may be implemented as a processor and/or controller of the three-dimensional printer. The disclosure does not intend to impose a limitation on this regard.

Figure 3:
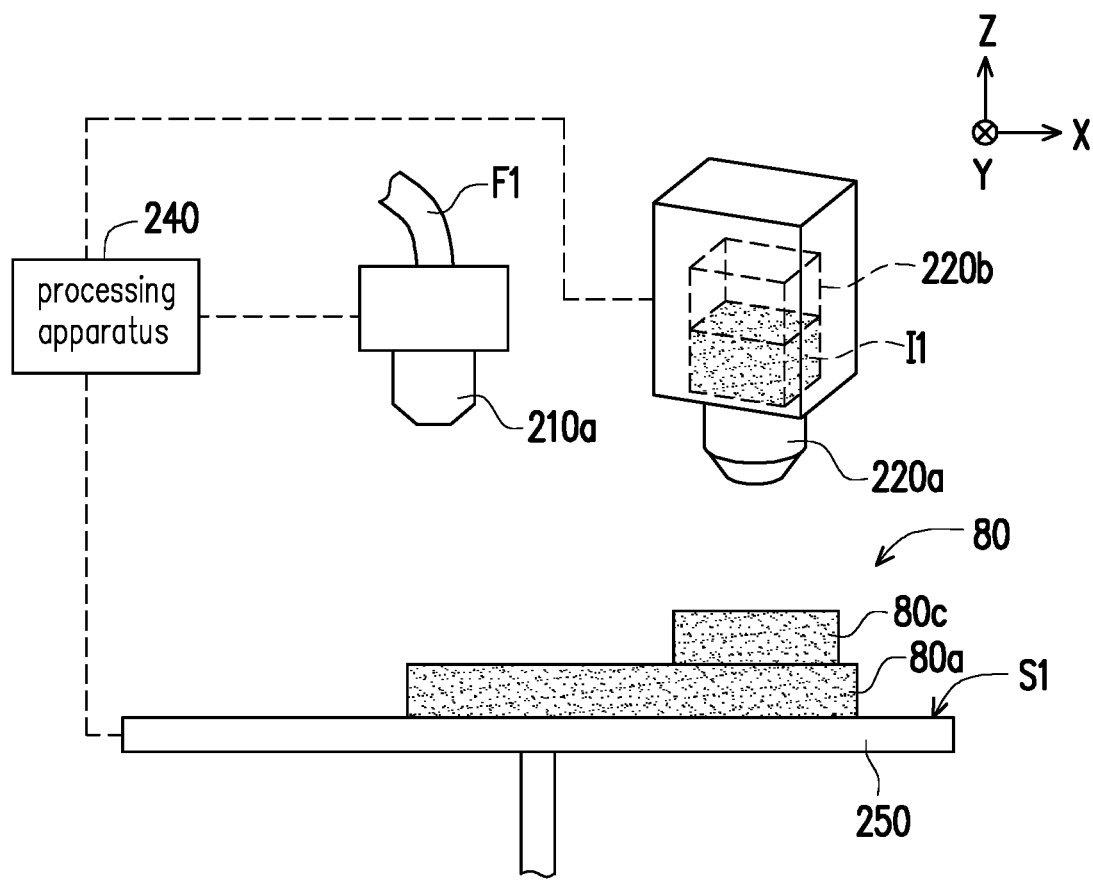
FIG. 3 is a schematic diagram of the three-dimensional printing equipment according to the embodiment of FIG. 2.

FIG. 3 is a schematic diagram of the three-dimensional printing equipment according to the embodiment of FIG. 2. With reference to FIG. 3, the print module 210 may include a print head 210a, and the inkjet module 220 may include an inkjet head 220a. Herein, a Cartesian coordinate system is provided for describing the related components and movements thereof. A forming platform 250 includes a carrying surface S1 for carrying a color three-dimensional object 80 in print. The forming platform 250 is disposed below the print head 210a and the inkjet head 220a.

Specifically, in this embodiment, the processing apparatus 240 may obtain a three-dimensional digital model. The three-dimensional digital model is compliant with a three-dimensional file format such as a polygon file format (PLY), a STL (stereolithography) file format, or an OBJ file format. The three-dimensional model in the three-dimensional file format is formed by a plurality of polygon meshes. Each of the polygon meshes is constituted by a plurality of vertexes, and coordinates of each of the vertexes are different. In this embodiment, the processing apparatus 240 may be configured to perform a slicing processing on the three-dimensional model to obtain a plurality of layer objects, so as to obtain layer information of each of the layer objects. The layer information includes a cross-sectional contour, an inkjet region, etc. of each of the layer objects. Based on the layer information, the processing apparatus 240 may control the three-dimensional printing equipment 20, so that the three-dimensional printing equipment 20 may produce the layer objects layer by layer and color the layer objects layer by layer.

In this embodiment, the three-dimensional printing equipment 20 prints the three-dimensional object 80 with fused deposition modeling (FDM) technique. That is, the print head 210a is configured to move along an XY plane and move in a normal direction (a Z axis direction) of the XY plane. A forming material F1 is fed into the print head 210a via a feeding line to be thermally melted and is extruded through the print head 210a to be molded layer by layer on the carrying surface S1 of the forming platform 250 to form a plurality of layer objects (FIG. 3 takes layer objects 80a and 80c as examples). In this sense, the layer objects 80a and 80c formed layer by layer stack each other on the carrying surface S1 to form the three-dimensional object 80. Specifically, the forming material F1 may be composed of a thermofusible material adapted to a fused filament fabrication (FFF) manufacturing method, a melted and extrusion modeling manufacturing method, and the like, which the disclosure is not intended to limit.

In this embodiment, the inkjet head 220a sprays ink I1 layer by layer on a contour edge portion of each of the layer objects 80a and 80c, such that the ink I1 overlaps and covers upper surfaces of the layer objects 80a and 80c. Therefore, the inkjet head 220a may include an ink cartridge 220b, and the ink cartridge 220b is configured to contain the ink I1. The inkjet head 220a is controlled by the processing apparatus 240 to spray the ink I1 in the ink cartridge 220b on the layer objects 80a and 80c to color edge portions of the layer objects 80a and 80c. Although FIG. 3 merely illustrates one ink cartridge 220b, the disclosure is not intended to limit an amount of the ink cartridge and ink color. For instance, the inkjet module 220 may include 4 ink cartridges of different colors (e.g., yellow (Y), magenta (M), cyan (C), and black (K)) and 4 corresponding inkjet heads.

With such arrangement, after the print head 210a prints the layer object 80a on the forming platform 250, the inkjet head 220a may spray ink on the upper surface of the layer object 80a so as to color the edge portion of the layer object 80a. Then, after the print head 210a prints the other layer object 80c on the forming platform 250, the inkjet head 220a may spray ink on the upper surface of the layer object 80c so as to color the edge portion of the layer object 80c. Such that, the colored layer objects sequentially stack so that a color three-dimensional object is formed through repeatedly performing the three-dimensional printing operation and the inkjet printing operation in turn.

Note that in the embodiments of the disclosure, the three-dimensional printing equipment 20 may perform the inkjet printing operation on the contour edge of each of the layer objects according to a pre-determined inkjet width, as such, a surface of the three-dimensional object may appear colors. To be specific, when the inkjet module 220 color the layer object, the inkjet module 220 moves on the XY plane along the cross-sectional contour of the layer object, so as to spray the ink I1 on a cross-sectional outer edge of the layer object. As the cross-sectional outer edge of each of the layer objects is colored, an outer surface of the final molded color three-dimensional object may show a variety of colors. That is, the inkjet region of each of the layer objects is determined based on the cross-sectional contour of the layer object and the inkjet width. To be more specifically, the processing apparatus 240 may produce an inkjet image corresponding to each of the layer objects in advance according to the cross-sectional contour of the layer object, so as to control the inkjet module 220 to perform the inkjet printing operation on the XY plane according to the inkjet images. Particularly, in the embodiments of the disclosure, the inkjet position determined based on the cross-sectional contour of each of the layer objects may be shifted according to a surface tilt degree corresponding to the layer object. Moreover, an inner-shift amount configured to determine shifting of the inkjet position is determined according to the surface tilt degree corresponding to the layer object.

Figure 4:
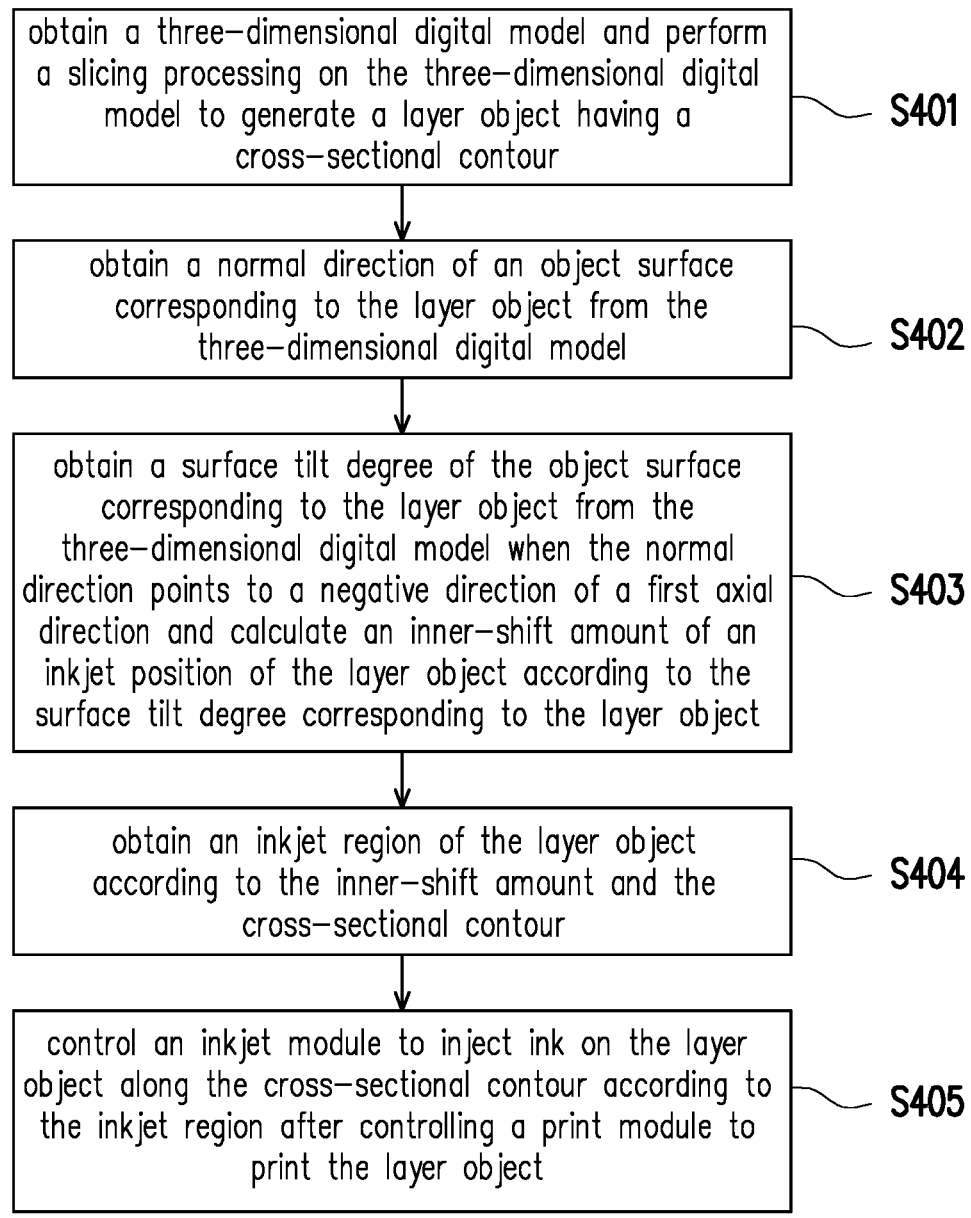
FIG. 4 is a flow chart of an inkjet position adjustment method according to an embodiment of the disclosure.

FIG. 4 is a flow chart of a three-dimensional color printing method according to an embodiment of the disclosure. The method of this embodiment is adapted for the three-dimensional printing equipment 20 of FIG. 2 and FIG. 3. Steps of the inkjet position adjustment method of this embodiment are explained in detail hereinafter with reference to the components of the three-dimensional printing equipment 20.

In step S401, the processing apparatus 240 obtains a three-dimensional digital model and performs a slicing processing on the three-dimensional digital model to generate a layer object having a cross-sectional contour. To be specific, the three-dimensional digital model (e.g., a STL file) is to be further compiled and calculated, so as to be converted into related information configured to carry out a three-dimensional color printing function. The processing apparatus 240 performs a slicing processing on the three-dimensional digital model to produce a plurality of layer objects first. Generally, the processing apparatus 240 slices the three-dimensional digital model by a plurality of layer planes with a fixed interval therebetween to obtain the cross-sectional contours of the layer objects. Here, a slicing interval for slicing the three-dimensional model may be considered as a slicing thickness of each of the layer objects.

Next, in step S402, the processing apparatus 240 obtains a normal direction of an object surface corresponding to the layer object from the three-dimensional digital model. In an embodiment, the processing apparatus 240 may obtain the normal direction of the object surface according to a normal vector of a polygon mesh of the three-dimensional digital model. Further, the processing apparatus 240 may obtain at least one polygon mesh corresponding to the layer object from the three-dimensional digital model and obtains the normal vector of the at least one polygon mesh through which the layer object passes. Based on the definition of the polygon mesh of the STL file format, the normal vector of the polygon mesh points to an outside of the three-dimensional digital model, and the normal vector of the polygon mesh is defined according to the right-hand rule.

To be specific, after obtaining multiple layer objects by performing the slicing processing, the processing apparatus 240 may further obtain multiple polygon meshes corresponding to each of the layer objects. That is, the processing apparatus 240 obtains the polygon meshes intersecting with the layer surface of the layer object and then obtains the normal vectors of the polygon meshes corresponding to the layer object. It can be known that when a normal direction of an object surface faces downwards (faces towards a negative Z axis), it means that the object surface faces downwards, and the edge portion of the layer object is suspended in midair. In other words, in order to form a shape of a downward-facing object surface, an edge of the upper layer object is configured to exceed an edge of the lower layer object.

Hence, in the embodiments of the disclosure, the processing apparatus 240 further determines whether the normal direction of the object surface points to a negative direction of a first axial direction (i.e., the Z axis). The first axial direction is perpendicular to a horizontal plane (i.e., the XY plane). To be specific, through determining that the Z axis of the normal vector of the polygon mesh corresponding to the layer object is positive or negative, the processing apparatus 240 may determine whether the normal direction of the object surface points to the negative direction of the Z axis. If the Z axis of the normal vector of the polygon mesh corresponding to the layer object is negative, the processing apparatus 240 may determine that the normal direction of the object surface points to the negative direction of the Z axis. Taking a triangular mesh for example, coordinates of three vertexes of the triangular mesh are (−10,10,10), (10, 10,10), and (0,0,0), and thus, a normal vector of the triangular mesh is (0,1,−1). Since the Z-axis component of the normal vector (0,1,−1) is negative, the processing apparatus 240 may determine that the normal direction of the object surface corresponding to the triangular mesh points to the negative direction of the Z axis.

Next, in step S403, when the normal direction points to the negative direction of the first axial direction, the processing apparatus 240 obtains a surface tilt degree of the object surface corresponding to the layer object from the three-dimensional digital model and calculates an inner-shift amount of an inkjet position of the layer object according to the surface tilt degree corresponding to the layer object. In step S404, the processing apparatus 240 obtains the inkjet region of the layer object according to the inner-shift amount and the cross-sectional contour. To be specific, the processing apparatus 240 generates an inkjet image according to the inner-shift amount, the inkjet width, and the cross-sectional contour, and the inkjet image includes the inkjet region which is formed based on the inner-shift amount. Specifically, in the embodiments of the disclosure, the processing apparatus 240 may determine an original inkjet region according to the cross-sectional contour of the layer object and the pre-determined inkjet width. The original inkjet region conforms the cross-sectional contour of the layer object generated by the slicing processing. When the normal direction points to the negative direction of the first axial direction, after the inner-shift amount of the inkjet position of the layer object is determined, the processing apparatus 240 adjusts the original inkjet region according to the inner-shift amount to generate a new original inkjet position. The new original inkjet region no longer conforms the cross-sectional contour of the layer object generated by the slicing processing.

Figure 5A:
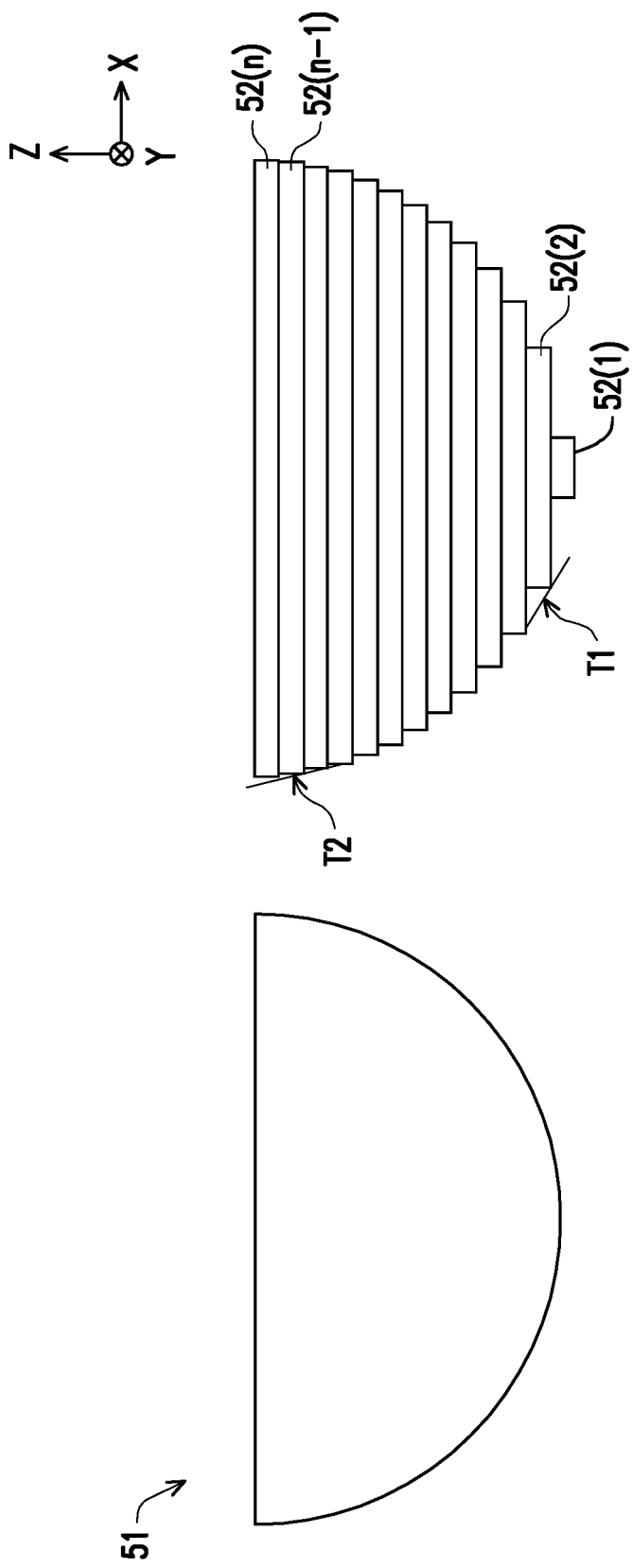
FIG. 5A and FIG. 5B are schematic diagrams of determining an ideal inkjet region according to an embodiment of the disclosure.
Figure 5B:
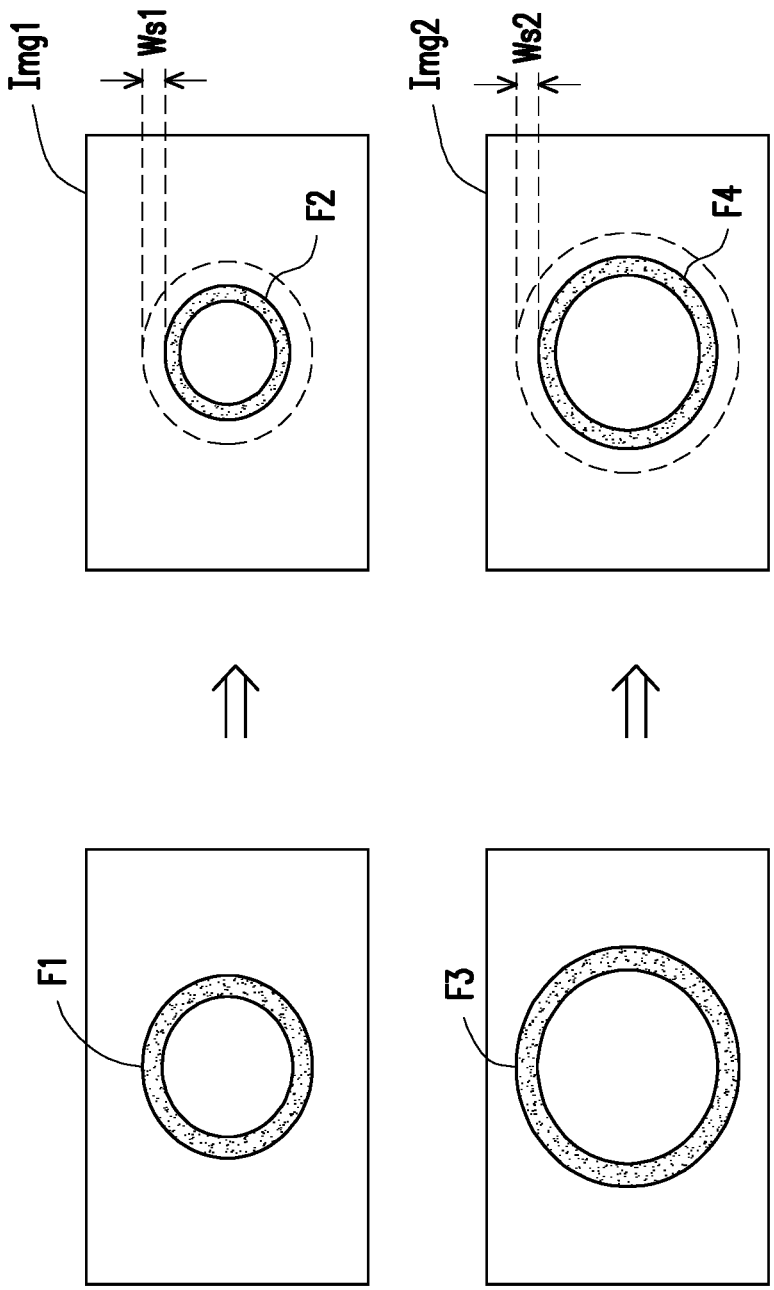

For instance, with reference to FIG. 5A and FIG. 5B together, FIG. 5A and FIG. 5B are schematic diagrams of determining an ideal inkjet region according to an embodiment of the disclosure. It is assumed that the processing apparatus 240 obtains a three-dimensional digital model 51, and the three-dimensional digital model 51 is a hemisphere with a downward-facing spherical surface. The processing apparatus 240 may perform the slicing processing on the three-dimensional digital model 51 first according to a same layer thickness to obtain a plurality of layer objects 52(1), 52(2), ..., 52(n-1), and 52(n). Herein, n is an integer greater than 0. The processing apparatus 240 may thereby obtain cross-sectional contours of the layer objects 52(1) to 52(n) through the slicing processing. In this embodiment, since the three-dimensional digital model 51 is a hemisphere, the cross-sectional contours of the layer objects 52(1) to 52(n) are circular contours, and radiuses of the circular contours are different. Moreover, surface tilt degrees corresponding to polygon meshes of the same one of layer object are identical.

Taking the layer object 52(2) for example, a normal direction of an object surface corresponding to the layer object 52(2) points to the negative direction of the first axial direction (the Z axis). The processing apparatus 240 thereby obtains a surface tilt degree T1 of the object surface corresponding to the layer object 52(2) from the three-dimensional digital model. As shown in FIG. 5B, the processing apparatus 240 may then calculate an inner-shift amount Ws1 according to the surface tilt degree T1 corresponding to the object surface of the layer object 52(2). The processing apparatus 240 inwardly shifts an original inkjet region F1 (composed of original inkjet region segments respectively corresponding to each of the polygon meshes of one layer object) according to the inner-shift amount Ws1 to generate a new inkjet region F2.

Taking another layer object 52(n-1) for example, a normal direction of an object surface corresponding to the layer object 52(n-1) points to the negative direction of the first axial direction (the Z axis). The processing apparatus 240 thereby obtains a surface tilt degree T2 of the object surface corresponding to the layer object 52(n-1) from the three-dimensional digital model. As shown in FIG. 5B, the processing apparatus 240 may then calculate an inner-shift amount Ws2 according to the surface tilt degree T2 corresponding to the object surface of the layer object 52(n-1). The processing apparatus 240 inwardly shifts an original inkjet region F3 (composed of original inkjet segments respectively corresponding to each of the polygon meshes of one layer object) according to the inner-shift amount Ws2 to generate a new inkjet region F4.

Note that since the surface tilt degree T1 corresponding to the object surface of the layer object 52(2) and the surface tilt degree T2 corresponding to the object surface of the layer object 52(n-1) are different from each other, the inner-shift amount Ws1 is different from the inner-shift amount Ws2. Herein, since the surface tilt degree T2 corresponding to the object surface of the layer object 52(n-1) is steeper than the surface tilt degree T1 corresponding to the object surface of the layer object 52(2), the inner-shift amount Ws2 is less than the inner-shift amount Ws1. That is, in an embodiment, whether the inkjet position can be inwardly shifted and the corresponding inner-shift amount can be individually determined for each of the layer objects.

Next, in step S405, after controlling the print module 210 to print the layer object, the processing apparatus 240 controls the inkjet module 220 to inject ink on the layer object along the cross-sectional contour according to the inkjet region. With reference to FIG. 5B, the processing apparatus 240 produces an inkjet image Img1 according to the inner-shift amount Ws1. The inkjet module 220 may spray the ink I1 on the layer object 52(2) according to a pixel position and a color eigenvalue of the inkjet region F2 recorded by the inkjet image Img1. The processing apparatus 240 produces an inkjet image Img2 according to the inner-shift amount Ws2. The inkjet module 220 may thus spray the ink I1 on the layer object 52(n-1) according to a pixel position and a color eigenvalue of the inkjet region F4 recorded by the inkjet image Img2.

Nevertheless, it should be noted that FIG. 5A and FIG. 5B are configured to merely illustrate examples of the disclosure and are not intended to limit the disclosure. After referring to the illustration described in FIG. 5A and FIG. 5B, people having ordinary skill in the art may acquire sufficient teachings and suggestions to infer how other similar processing can be performed on three-dimensional digital models of other shapes.

Several exemplary embodiments are described below to illustrate how to obtain the surface tilt degree of the object surface corresponding to the layer object. In an embodiment, a three-dimensional digital model is formed by a plurality of polygon meshes. Each of the polygon meshes has a plurality of vertexes, and coordinates of each of the vertexes are different. For instance, the polygon meshes may be triangle meshes in general, and each of the polygon mesh may be regarded as a triangular facet formed by three vertexes. When the slicing processing is performed, one layer surface configured to perform the slicing processing passes through part of the polygon meshes of the three-dimensional digital model so as to extract a cross-sectional contour of the layer object. Therefore, in an embodiment, the processing apparatus 240 may obtain at least one polygon mesh corresponding to the layer object from the three-dimensional digital model. Next, the processing apparatus 240 may calculate at least one included angle between the at least one polygon mesh and the horizontal plane to represent the surface tilt degree corresponding to the layer object. To be specific, the processing apparatus 240 can calculate the included angle between the polygon mesh and the horizontal plane according to the coordinates of the vertexes of the polygon mesh.

Figure 6:
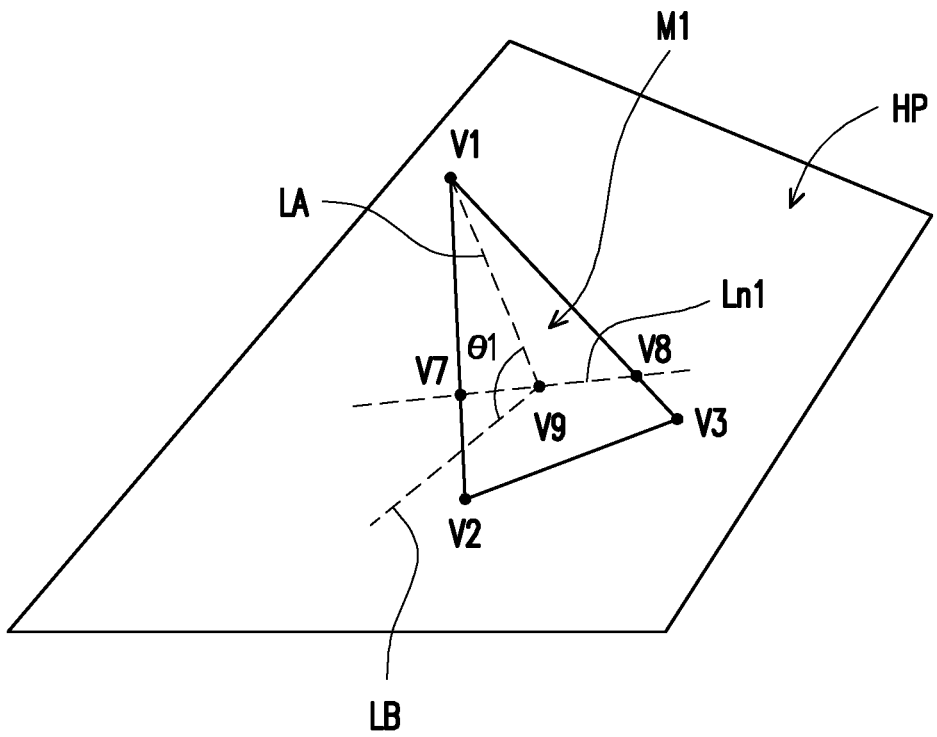
FIG. 6 is a schematic diagram of an included angle between a polygon mesh and a horizontal plane according to an embodiment of the disclosure.
Figure 6:
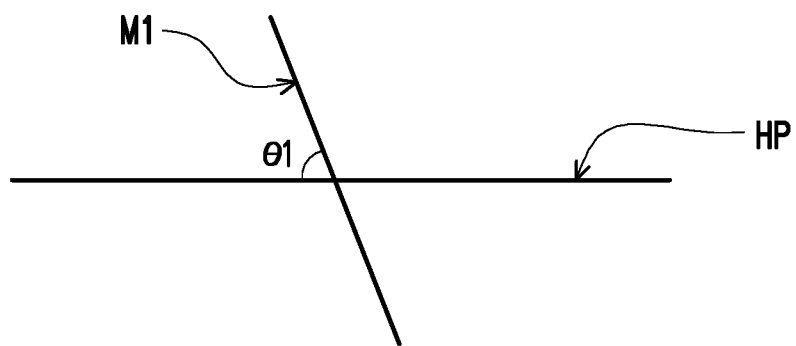

With reference to FIG. 6, FIG. 6 is a schematic diagram of an included angle between a polygon mesh and a horizontal plane according to an embodiment of the disclosure. It is assumed that the layer object corresponds to a triangle mesh M1 constituted by vertexes V1, V2, and V3. The processing apparatus 240 calculates an included angle between the triangle mesh M1 and a horizontal plane HP, so as to obtain the included angle representing the surface tilt degree of the object surface. The horizontal plane HP may be regarded as the XY plane. Further, when the slicing processing is performed by using the horizontal plane HP, the horizontal plane HP intersects the triangle mesh M1 in intersection points V7 and V8. A straight line Ln1 between the intersection point V7 and the intersection point V8 may constitute a portion of a cross-sectional contour. An included angle $\theta1$ between the triangle mesh M1 and the horizontal plane HP is the included angle between a triangular plane determined by the vertex V1 and the two intersection points V7 and V8 and the horizontal plane HP. The included angle $\theta1$ between the triangle mesh M1 and the horizontal plane HP may be obtained through the following. A perpendicular line LA passing through the vertex V1 and perpendicular to the straight line Ln1 (a connection line between the intersection point V7 and the intersection point V8) is obtained. The perpendicular line LA intersects the straight line Ln1 in a pedal point V9. Next, another perpendicular line LB passing through the pedal point V9, perpendicular to the straight line Ln1, and located on the horizontal plane HP is obtained. In this way, the included angle $\theta1$ may be obtained through calculating the included angle between the perpendicular line LA and the perpendicular line LB. Nevertheless, included angles between two perpendicular lines may include a first included angle between 0 to 90 degrees and a second included angle between 90 to 180 degrees. In the embodiments of the disclosure, the first included angle between 0 to 90 degrees acts as the included angle between the triangle mesh M1 and the horizontal plane HP. Note that the processing apparatus 240 may also calculate another included angle between another triangle mesh of the same layer object and the horizontal plane HP, so as to obtain another included angle representing the surface tilt degree of the object surface. That is, as regards the same layer object, the layer object may correspond to multiple different included angles. In other words, as regards the same layer object, since a shape of the three-dimensional digital model is irregular, one single layer object may correspond to multiple different surface tilt degrees.

As described above, when the slicing processing is performed by using the horizontal plane HP, the horizontal plane HP intersects the triangle mesh M1 in the intersection point V7 and the intersection point V8. The straight line Ln1 between the intersection point V7 and the intersection point V8 is a segment portion of the cross-sectional contour. Accordingly, the processing apparatus 240 may calculate the inner-shift amount corresponding to the segment portion of the cross-sectional contour of the triangle mesh M1. That is, several different triangle meshes may pass through the same layer surface. Hence, for the same layer object, the processing apparatus 240 may accordingly calculate multiple inner-shift amounts corresponding to different contour segments of the cross-sectional contour.

In an embodiment, after obtaining at least one included angle representing the surface tilt degree, the processing apparatus 240 may calculate the inner-shift amount of the inkjet position of the layer object according to the at least one included angle between the polygon mesh and the horizontal plane and the pre-determined inner-shift amount. In an embodiment, the processing apparatus 240 may calculate the inner-shift amount of the inkjet position of the layer object according to formula (1) as follows.

$$Ws_{iedal} = Wd \times \cos\theta \times R1 \qquad \text{formula (1)}$$

Herein, $Ws_{ideal}$ represents the inner-shift amount, θ represents the included angle between the polygon mesh and the horizontal plane, Wd represents the pre-determined inner-shift amount, and R1 represents an adjustment parameter. With reference to formula (1), the processing apparatus 240 calculates a product of a cosine value of the at least one included angle, the pre-determined inner-shift amount, and the adjustment parameter to obtain the inner-shift amount. The pre-determined inner-shift amount and the adjustment parameter may be designed according to actual needs. It can thus be seen that the inner-shift amount increases as the included angle between the polygon mesh and the horizontal plane decreases, and the inner-shift amount decreases as the included angle between the polygon mesh and the horizontal plane increases. In other words, the processing apparatus 240 determines the corresponding inner-shift amount according to the included angle between the polygon mesh and the horizontal plane.

In addition, in an embodiment, the pre-determined inner-shift amount may be configured to correspond to a reference angle. The adjustment parameter may be a reciprocal of a cosine value of the reference angle, and the reference angle is between 0 to 90 degrees. For instance, it is assumed that the reference angle is 45 degrees, and the pre-determined inner-shift amount corresponds to a reference amount of 45 degrees such as 0.5 cm, and formula (1) may further be set to formula (2).

$$Ws_{Sideal} = Wd \times \cos\theta \times \frac{1}{\cos\theta_r} = Wd = \cos\theta \times \frac{2}{\sqrt{2}} \qquad \text{formula (2)}$$

Herein, $Ws_{ideal}$ represents the inner-shift amount, θ represents the included angle (e.g., the included angle θ1 shown in FIG. 6) between the polygon mesh and the horizontal plane, Wd represents the pre-determined inner-shift amount, and θr represents the reference angle. In this case, it can be seen that according to formula (2), when the included angle θ between the polygon mesh and the horizontal plane and the reference angle are equal (45 degrees), the inner-shift amount $Ws_{ideal}$ calculated by the processing apparatus 240 and the pre-determined inner-shift amount Wd are equal.

Note that calculation presented by formula (1) and formula (2) is only an implementation of the disclosure. In other embodiments, the processing apparatus 240, for example, may look up a table by using a pre-predetermined lookup table based on the included angle representing the surface tilt degree to obtain the corresponding inner-shift amount. For instance, if the included angle representing the surface tilt degree is within a first pre-determined angular range, the processing apparatus may directly obtain an inner-shift amount corresponding to the first pre-determined angular range according to the lookup table. If the included angle representing the surface tilt degree is within a second pre-determined angular range, the processing apparatus may directly obtain an inner-shift amount corresponding to the second pre-determined angular range according to the lookup table. Here, the first pre-determined angular range is different from the second pre-determined angular range.

In addition, as described above, the same layer object may also correspond to different surface tilt degrees in an irregular three-dimensional digital model. That is, the angles between polygon meshes corresponding to the layer object and the horizontal plane are different. In this case, the polygon meshes corresponding to the layer object may include a first polygon mesh and a second polygon mesh. In an embodiment, the processing apparatus 240 calculates a first included angle between the first polygon mesh and the horizontal plane and calculates a second included angle between the second polygon mesh and the horizontal plane. Next, the processing apparatus 240 calculates a first inner-shift amount of the inner-shift amount according to the first included angle and the pre-determined inner-shift amount and calculates a second inner-shift amount of the inner-shift amount according to the second included angle and the pre-determined inner-shift amount. That is, the same layer object may correspond to multiple different inner-shift amounts. Generally, when two three-dimensional digital models having similar volume are provided, the more complex or more irregular model has more polygon meshes while sizes of the polygon meshes are smaller, and thus the more complex or more irregular model may correspond to more inner-shift amounts which are different from each other.

Figure 7:
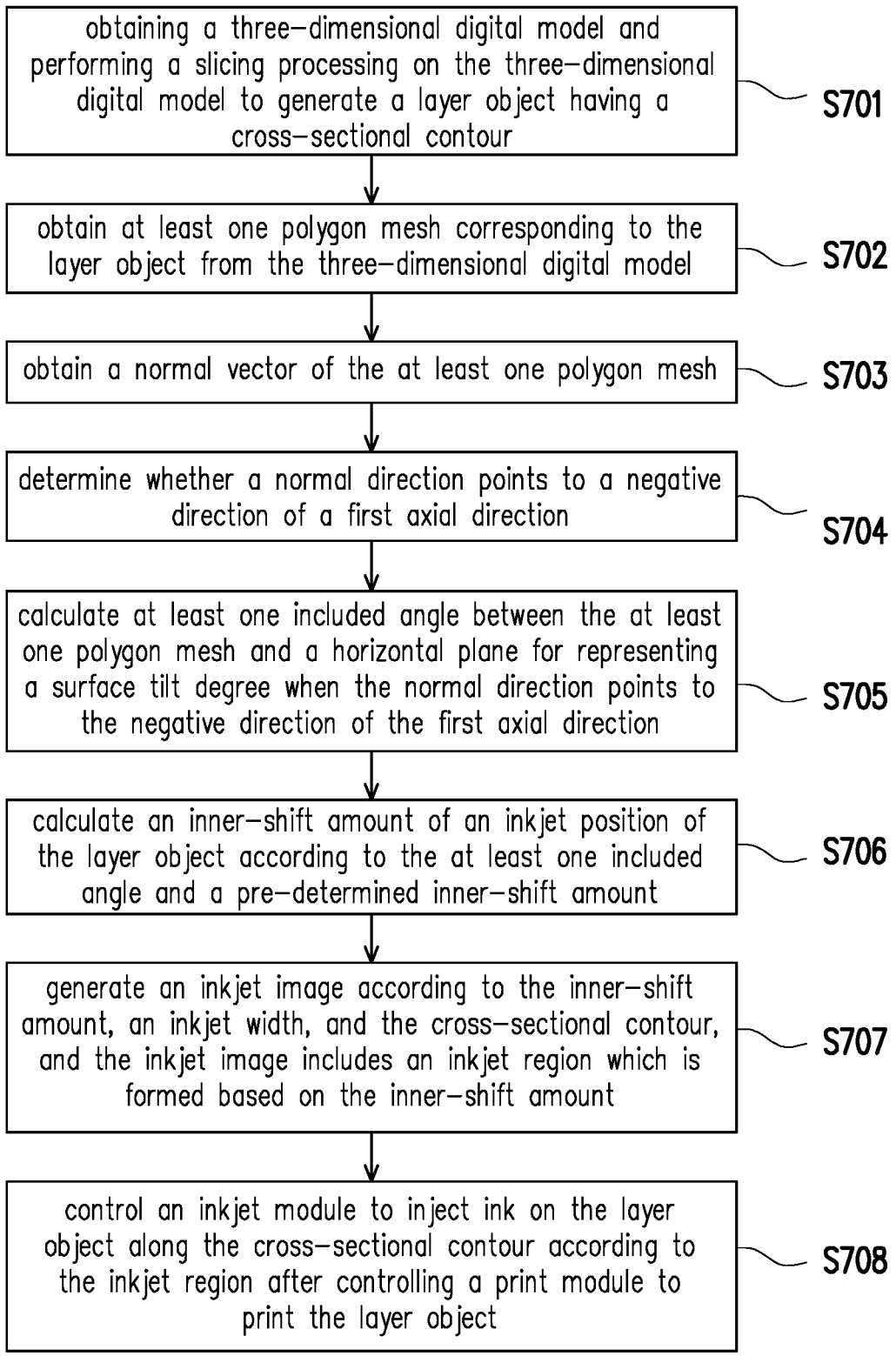
FIG. 7 is a flow chart of an inkjet width adjustment method according to an embodiment of the disclosure.

FIG. 7 is a flow chart of an inkjet position adjustment method according to an embodiment of the disclosure, and detailed implementation of the method may be obtained with reference to the embodiments of FIG. 2 to FIG. 6. With reference to FIG. 7, in step S701, a three-dimensional digital model is obtained, and a slicing processing is performed on the three-dimensional digital model to generate a layer object having a cross-sectional contour. In step S702, at least one polygon mesh corresponding to the layer object is obtained from the three-dimensional digital model. In step S703, a normal vector of the at least one polygon mesh is obtained. In step S0704, whether a normal direction points to the negative direction of the first axial direction is determined according to the normal vector of the at least one polygon mesh. In step S705, when the normal direction points to the negative direction of the first axial direction, at least one included angle between the at least one polygon mesh and a horizontal plane is calculated for representing a surface tilt degree. In step S706, an inner-shift amount of an inkjet position of the layer object is calculated according to the at least one included angle and a pre-determined inner-shift amount. In step S707, an inkjet image is generated according to the inner-shift amount, an inkjet width, and the cross-sectional contour, and the inkjet image includes an inkjet region which is formed based on the inner-shift amount. In step 708, after a print module is controlled to print the layer object, an inkjet module is controlled to inject ink on the layer object along the cross-sectional contour according to the inkjet region.

In view of the foregoing, in the inkjet position adjustment method and the three-dimensional printing equipment provided by the embodiments of the disclosure, the inner-shift amount of the inkjet position may be determined according to the surface tilt degree corresponding to the layer object. Further, a new inkjet position is generated by shifting the original inkjet position according to the inner-shift amount. After the layer object is printed by the print head, the three-dimensional printing equipment may control the inkjet module to inject ink on the layer object along the cross-sectional contour according to the adjusted inkjet region. In this way, the ink is prevented from spilling on the three-dimensional object or platform below when the edge of the layer object collapses. Therefore, the three-dimensional printing equipment provided by the disclosure is evidently capable of providing enhanced printing quality for three-dimensional color printing.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An inkjet position adjustment method, adapted to print a color three-dimensional object, the inkjet position adjustment method comprising:
    obtaining a three-dimensional digital model and performing a slicing processing on the three-dimensional digital model to generate a layer object having a cross-sectional contour;
    obtaining a normal direction of an object surface corresponding to the layer object from the three-dimensional digital model;
    obtaining a surface tilt degree of the object surface corresponding to the layer object from the three-dimensional digital model and calculating an inner-shift amount corresponding to the layer object according to the surface tilt degree corresponding to the layer object when the normal direction points to a negative direction of a first axis, wherein the first axis is perpendicular to a horizontal plane, and the negative direction of the first axis points below the horizontal plane;
    obtaining an inkjet region of the layer object according to the inner-shift amount and the cross-sectional contour; and
    controlling an inkjet module to inject ink on the layer object along the cross-sectional contour according to the inkjet region after controlling a print module to print the layer object.

2. The inkjet position adjustment method as claimed in claim 1, wherein the step of obtaining the normal direction of the object surface corresponding to the layer object from the three-dimensional digital model comprises:
    obtaining at least one polygon mesh corresponding to the layer object from the three-dimensional digital model; and
    obtaining a normal vector of the at least one polygon mesh, wherein the normal vector points to an outside of the three-dimensional digital model.

3. The inkjet position adjustment method as claimed in claim 2, wherein the step of obtaining the surface tilt degree of the object surface corresponding to the layer object from the three-dimensional digital model when the normal direction points to the negative direction of the first axis and calculating the inner-shift amount of the inkjet position of the layer object according to the surface tilt degree corresponding to the layer object comprises:
    calculating at least one included angle between the at least one polygon mesh and a horizontal plane for representing the surface tilt degree; and
    calculating the inner-shift amount of the inkjet position of the layer object according to the at least one included angle and a pre-determined inner-shift amount.

4. The inkjet position adjustment method as claimed in claim 3, wherein the step of calculating the inner-shift amount of the inkjet position of the layer object according to the at least one included angle and the pre-determined inner-shift amount comprises:
    calculating a product of a cosine value of the at least one included angle, the pre-determined inner-shift amount, and an adjustment parameter to obtain the inner-shift amount.

5. The inkjet position adjustment method as claimed in claim 4, wherein the pre-determined inner-shift amount corresponds to a reference angle, the adjustment parameter is a reciprocal of a cosine value of the reference angle, and the reference angle is between 0 degree to 90 degrees.

6. The inkjet position adjustment method as claimed in claim 3, wherein the at least one polygon mesh comprises a first polygon mesh and a second polygon mesh, and the step of calculating the at least one included angle between the at least one polygon mesh and the horizontal plane comprises:
    calculating a first included angle between the first polygon mesh and the horizontal plane and calculating a second included angle between the second polygon mesh and the horizontal plane.

7. The inkjet position adjustment method as claimed in claim 6, wherein the step of calculating the inner-shift amount of the inkjet position of the layer object according to the at least one included angle and the pre-determined inner-shift amount comprises:
    calculating a first inner-shift amount of the inner-shift amount according to the first included angle and the pre-determined inner-shift amount; and
    calculating a second inner-shift amount of the inner-shift amount according to the second included angle and the pre-determined inner-shift amount.

8. The inkjet position adjustment method as claimed in claim 1, wherein the step of obtaining the inkjet region of the layer object according to the inner-shift amount and the cross-sectional contour comprises:

generating an inkjet image according to the inner-shift amount, an inkjet width, and the cross-sectional contour, wherein the inkjet image comprises the inkjet region which is formed based on the inner-shift amount.

\* \* \* \* \*